United States Patent [19]
Manikundalam et al.

[11] Patent Number: 5,799,188
[45] Date of Patent: Aug. 25, 1998

[54] SYSTEM AND METHOD FOR MANAGING VARIABLE WEIGHT THREAD CONTEXTS IN A MULTITHREADED COMPUTER SYSTEM

[75] Inventors: Ravindranath K. Manikundalam; Freeman Leigh Rawson, III, both of Austin, Tex.

[73] Assignee: International Business Machines Corporation, Armonk, N.Y.

[21] Appl. No.: 572,925

[22] Filed: Dec. 15, 1995

[51] Int. Cl.[6] ........................................... G06F 9/44
[52] U.S. Cl. ........................................... 395/678; 395/677
[58] Field of Search ........................... 395/678, 733, 395/477, 670

[56] References Cited

U.S. PATENT DOCUMENTS

| | | |
|---|---|---|
| 4,658,351 | 4/1987 | Teng. |
| 5,179,702 | 1/1993 | Spix et al.. |
| 5,345,588 | 9/1994 | Greenwood et al. ............ 395/650 |
| 5,526,521 | 6/1996 | Fitch et al. ....................... 395/678 |
| 5,613,114 | 3/1997 | Anderson et al. ............... 395/678 |

OTHER PUBLICATIONS

*Client/Server Programming with OS/2 2.1*, 3rd Edition, 1993, Chapter 14, "Processes, Threads, and Semaphores", R. Orfali et al., pp. 229–236.

*Computer Science*, Carnegie Mellon, Aug. 1987, "Mach Threads and the Unix Kernel: The Battle for Control", A. Tevanian, Jr. et al, pp. 1–12.

*Primary Examiner*—Majid A. Banankham
*Attorney, Agent, or Firm*—Mark S. Walker

[57] ABSTRACT

A system and method for managing variable weight contexts in a multithreaded operating system. Each thread is allocated a standard thread state. In addition, each thread has an indicator of whether or not it has variable context in addition. The variable context indicator is used to access a flavor table that specifies the structure of the additional thread state information. The flavor table, in one embodiment, contains an indicator specifying whether the variable context data is to be saved and restored during a context switch. The standard thread state context is saved on a context and the variable context is saved only for those threads that use the context and only when the flavor table indicates that the variable context should be saved.

8 Claims, 5 Drawing Sheets

5,799,188

SYSTEM AND METHOD FOR MANAGING VARIABLE WEIGHT THREAD CONTEXTS IN A MULTITHREADED COMPUTER SYSTEM

BACKGROUND OF THE INVENTION

1. Field of the Invention

The present invention relates to systems and methods for managing computer operating systems. More particularly, it relates to systems and methods for managing thread contexts in a multithreaded operating system.

2. Background and Related Art

Computer operating systems are used to increase the utilization of computer resources including the central processing unit(CPU) and input/output resources. The CPU is typically several orders of magnitude faster than the input/output devices and therefore must frequently wait for those devices to provide it data. An operating system schedules instructions into the CPU in an effort to keep the CPU busy at all times.

Operating systems such as the UNIX® operating system (UNIX is a registered trademark in the United States and other countries licensed exclusively through X/Open Company Ltd.) schedule processes for execution. Each process defines an address space and processor resources and has a single flow of execution control. The process executes instructions from the instruction stream for that process in sequence. The process terminates when the instruction sequence reaches its logical termination point.

Several operating systems have implemented a new model that allows multiple streams of control to exist concurrently within a single defined set of system resources. This model implements multiple "threads" of execution. A thread is a light-weight process that has minimal non-shared state. The address space in which a thread executes and the resources to which it has access are shared with other threads within a task. The task defines the execution environment and manages the system resources for that environment. Each task must have at least one thread and each thread must be in exactly one task.

Operating systems that implement a multithreaded model include the IBM OS/2® operating system and the Carnegie Mellon University MACH operating system.

Each thread in a multithreaded operating system is presumed to be exactly like the other threads in that operating system. Each thread has certain state information that it needs for execution. This information includes a stack pointer, the address of the first instruction to execute, and the state of various flags. Typically the state is composed of the hardware machine registers. Each system architecture, therefore, must define the setup of a unique set of state information to run a thread on that machine architecture.

The state for a particular architecture may be further divided into flavors for different sets of state information. (See, J. Boykin, *Programming Under Mach*, 1993, pp. 30-31.) For example, a floating point register state could be defined separate from the regular machine state. Specification or interpretation of thread state in this situation requires that the operating system evaluate the state flavor before evaluation the state. This extra evaluation prevents the development of portable applications because the interpretation of the thread state is dependent on the flavor settings. Interpretation of flavor settings also slows down the thread execution by adding processing overhead.

The size and content of the thread state is particularly important to the speed of context switching in the operating system. A context switch occurs whenever a thread must give execution control to another thread. This can occur during the processing if interrupts or due to the preemption of the execution of the current thread. A context switch requires that all pertinent state information about the currently executing thread be saved and the state information about the new thread be re-loaded. The system doesn't know much about an executing thread so must, by default, save all thread state information. A large thread state requires more resources and time to store and retrieve than would a smaller one. Context switching speed can be improved by reducing the size of the thread context that is saved and restored.

A technical problem therefore exists to provide a system and method for efficiently operating a multithreaded operating system that has threads with having different amounts of state information. Efficient operation includes minimizing the system overhead required to maintain the different state information and minimizing the context switching overhead.

SUMMARY OF THE INVENTION

The present invention is directed to a system and method for operating threads with different state information. The present invention defines a standard set of thread information that is present in all threads and a second, variable set of information that is optionally present for each thread. The variable information set defines a thread class for that particular thread. In one embodiment, the variable context information has the additional property of defining whether or not that information must be saved and restored on a context switch. The preferred embodiment of the invention reduces thread storage consumption and improves context switch performance.

The present invention relates to a computer implemented method for managing a thread in a multithreaded operating system, comprising the steps of: creating a thread based on a thread class, the thread including a standard thread state memory area, a variable thread state indicator memory area containing a value based on the thread class, and, if a variable state is indicated by the thread class, a variable thread state memory area; detecting a thread context switch; and saving the current thread state and restoring a new thread state based upon the thread class of the current thread.

It is therefore an object of the invention to provide a multithreaded operating system with threads having different state information.

It is yet another object of the invention to provide a context switching method that analyzes a thread state class and saves and restores only that information required to be saved or restored for that particular thread class.

It is yet another object of the invention to provide a thread management method that minimizes the processor overhead required to interpret the thread class of a particular thread.

The foregoing and other objects, features and advantages of the invention will be apparent from the following more particular description of a preferred embodiment of the invention, as illustrated in the accompanying drawing wherein like reference numbers represent like parts of the invention.

3

Figure 3:
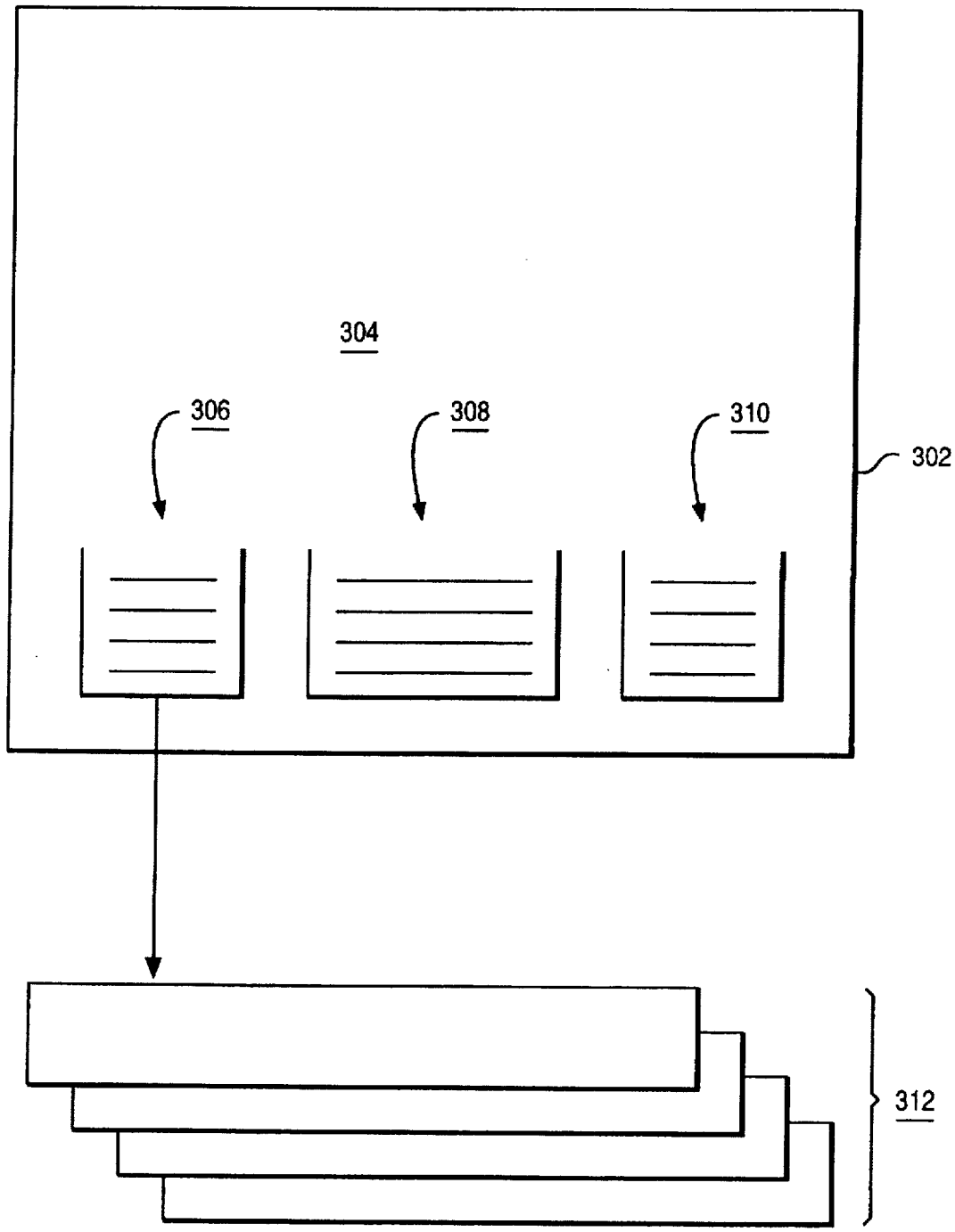

FIG. 3 is a block diagram illustrating the logical address space created for each task in a multithreaded operating system.

Figure 4:
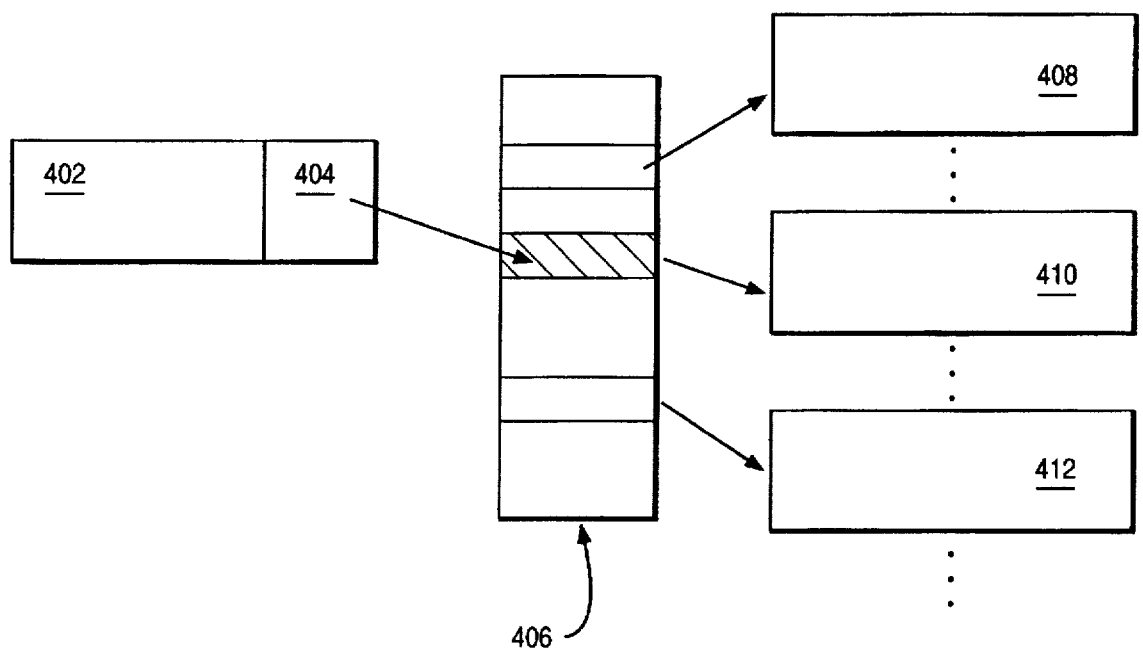

FIG. 4 is a block diagram illustrating the thread state storage and variable context storage for a thread according to the present invention.

Figure 5A:
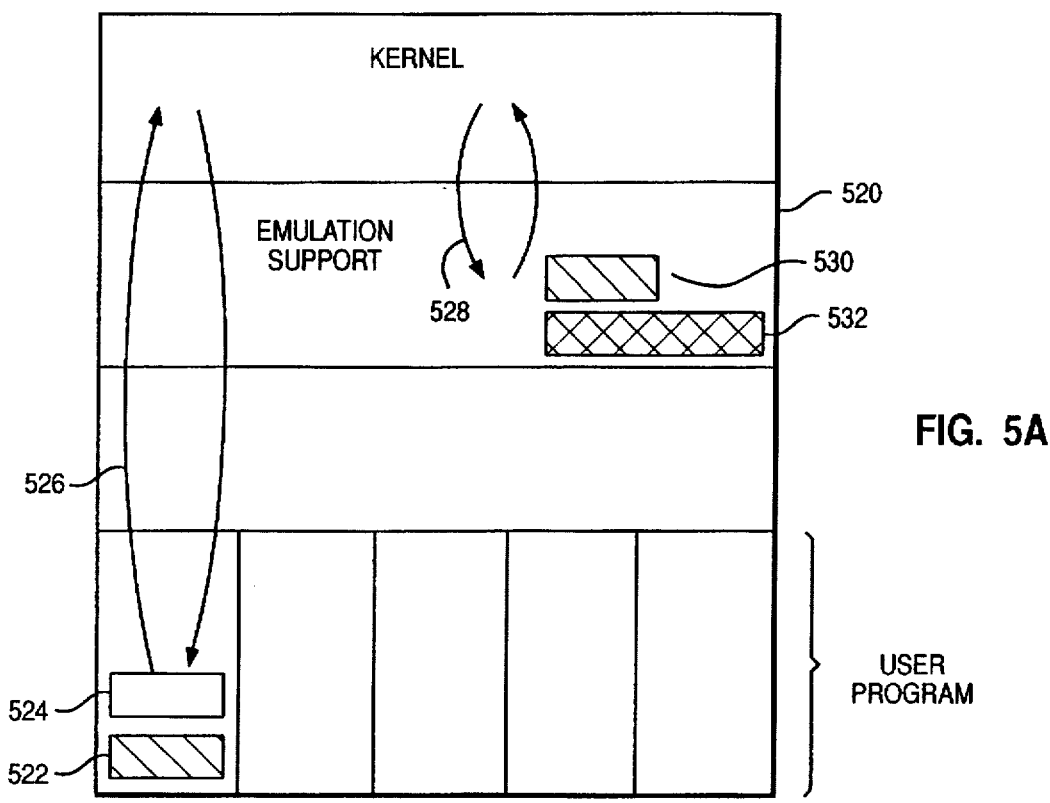

FIG. 5A illustrates a user program emulation services invocation sequence.

Figure 5B:
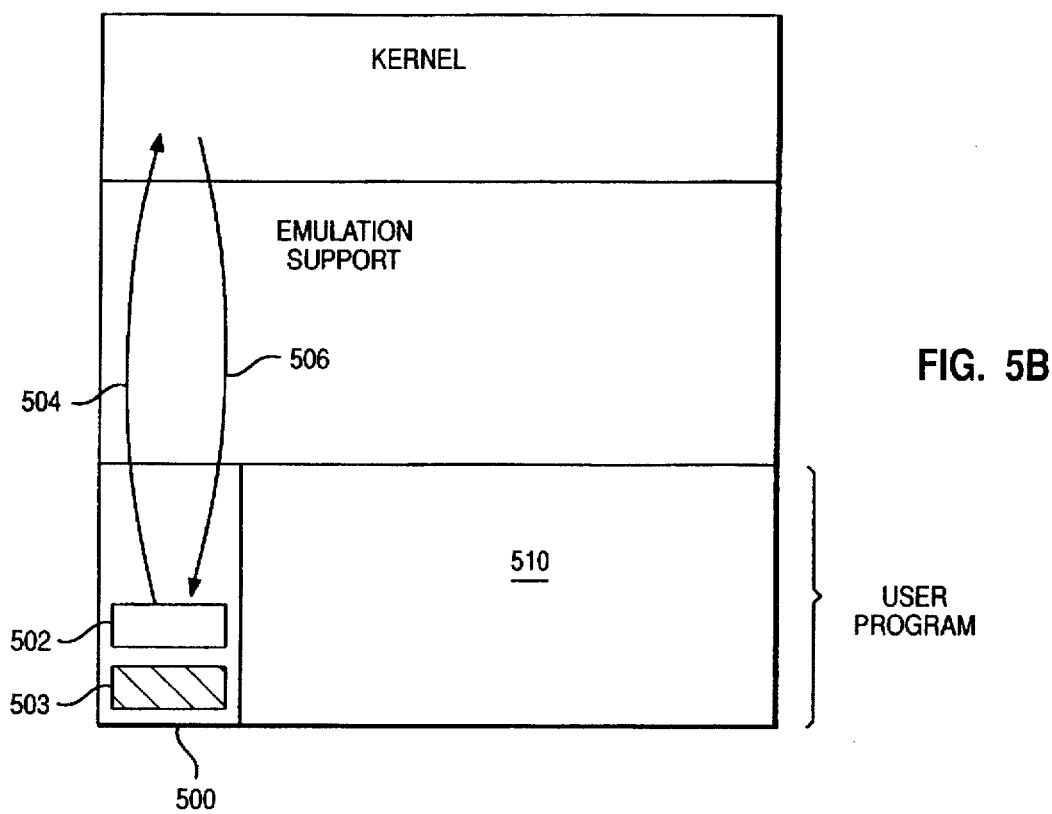

FIG. 5B illustrates a user program kernel services invocation sequence where no emulation services are required.

DETAILED DESCRIPTION

Figure 2:
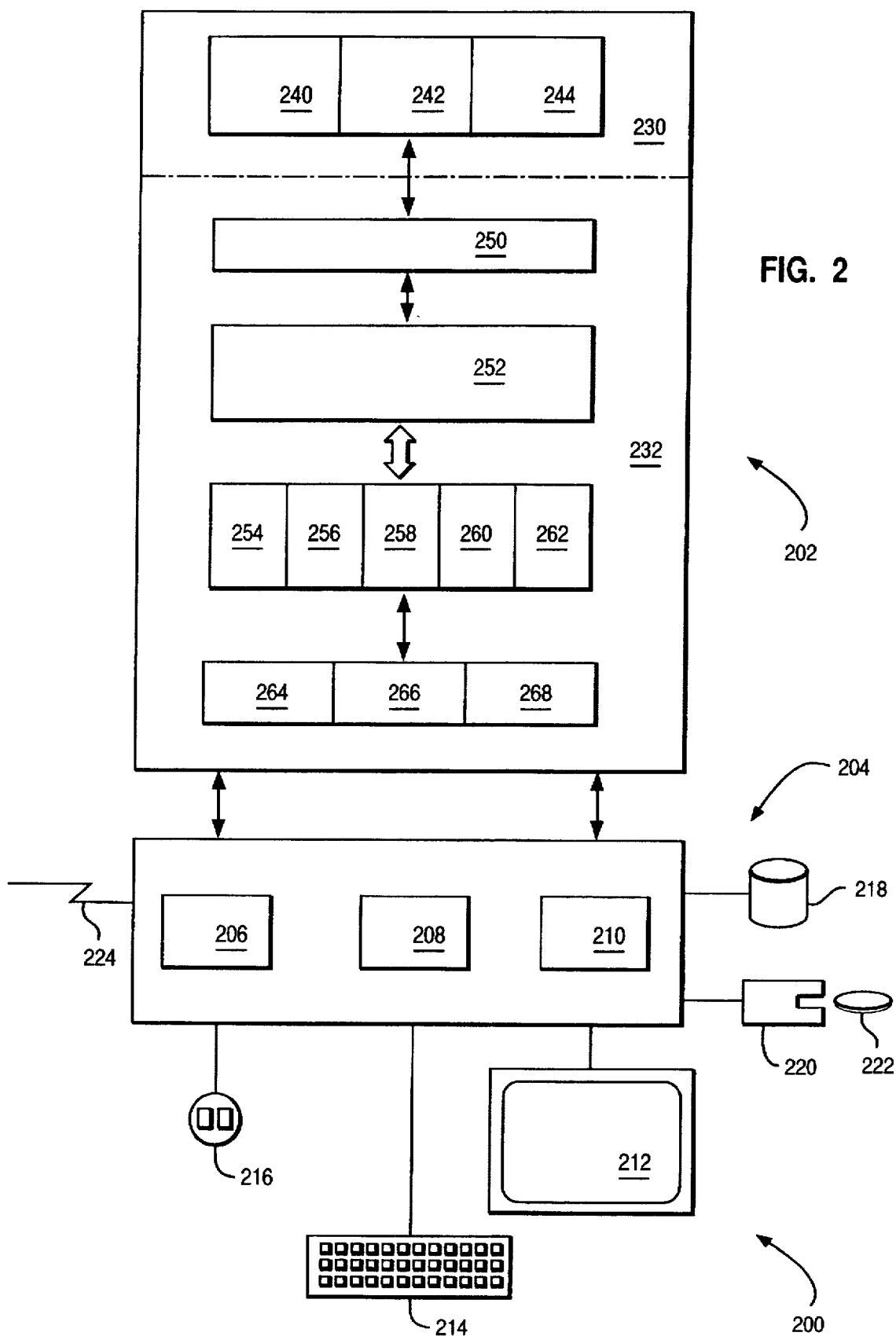
FIG. 2 is a block diagram of the hardware and software configuration of the preferred embodiment of the present invention.

The preferred embodiment of the present invention operates in a software and hardware computer system such as that shown in FIG. 2. The system 200 has a hardware component 204 and a software component 202.

The hardware component 204 contains the processing and system resources required to perform the user specified task. Component 204 includes a processor engine 206 that contains one or more central processing units (CPUs) capable of executing instructions having a particular instruction format. Memory 208 is provided to store the software programs and data. Peripheral and network control 210 controls attached devices such as display monitor 212, keyboard 214, pointing device 216, permanent data storage device 218, removable data storage device 220, and network interface 224. Permanent data storage device 218 can be any form of magnetic, optical or other storage technology such as that found in commercially available hard disk storage units. Removable storage device 220 is a device such as a diskette reader/write accepting magnetic or optical diskettes 222 or similar removable devices.

The software component 202 includes an application part 230 and an operating system part 232. Application part 230 contains user programs 240, 242, 244 that perform functions requested by the system user. The operating system part 232 performs the functions required to schedule and run the application programs and to handle other system administrative tasks.

The operating system includes hardware dependent code 266 necessary to operate the particular hardware system 204, device dependent code 268 required to operate specific devices attached to system 204, and machine independent code 264 that performs functions that do not rely on the particular hardware platform.

The microkernel layer 254, 256, 258, 260, 262 provides services including interprocess communication support (IPC), virtual memory management, task and thread management 258, host and processor set management, and I/O support and interrupts. The present invention is directed to improvements to the thread and task management portion.

A set of operating system services are provided at 252 including paging management and various device drivers. Finally, the operating system interface is provided at 250. The operating system interface establishes the application program interface (API) expected by the applications and services the application requests by invoking the services of the other operating system components.

The preferred embodiment of the present invention uses the IBM PS/2® computer system and the IBM Microkernel Program Product (based on the CMU Mach Microkernel product) supporting the IBM OS/2 operating system. (RISC System/6000 and OS/2 are trademarks of the IBM Corp.) It will be recognized, however, that any computer hardware can be substituted and that other systems implementing a

4

"microkernel" approach can be used. The present invention can be practiced in any multithreaded operating system and is not limited to those based on a microkernel approach.

The tasks and threads support 258 creates and manages tasks within the operating system. The execution of an application program 240 causes the creation of a task within the operating system. The preferred embodiment uses a task_create call to establish a task environment 302 shown in FIG. 3. The task environment 302 is an address space that provides the logical space for the memory used by the task and for the processing threads and ports for that task. The Mach microkernel uses ports for interprocess communications with ports defined for sending or receiving messages from other tasks and threads in the system. The task environment 302 contains information about the threads 306, the ports 308, and the virtual memory 310 associated with that task.

Task and thread support next creates at least one processing thread 312 for the task. Only a thread executes instructions so a task without a thread can accomplish no work.

The creation of a new thread using a thread_create call sets up the thread state and resources required to process that thread. The thread state of the present invention is divided into two parts, a standard state portion and a variable context portion. The standard state portion is defined for every thread in the system and contains information necessary for scheduling and processing the thread. The standard state portion (402 in FIG. 4) contains one or more register definitions for registers used or required by all threads in the system. The standard state also includes a variable context pointer 404 indicating which, if any, variable context information should be associated with this thread. The variable context pointer 404 addresses a "flavor array" 406 that points to the state structure 408, 410, 412 for that particular flavor. Each state structure contains a template defining the state information for that particular flavor.

The preferred embodiment of the present invention creates multiple thread classes, each using a different variable context flavor. Creation of a new thread therefore requires first that the thread class be defined and that the thread_create call include the thread class.

The preferred embodiment implements a thread class for emulating X86 architecture real-mode instructions. X86 real-mode emulation requires additional state data. The alternative of adding this state information to all threads in the system is undesirable because of the overhead to context switches that must save and restore this additional data even though is present only in a small percentage of the threads.

The preferred embodiment maintains a standard set of thread state information 404 that can be used by the Microkernel without interpretation or evaluation. The form and content of that state information is the same for all threads in the system. Whenever the additional state information is required, it is accessed via the variable context pointer. Those portions of the system that require that variable context information will be aware of their need and the method for retrieving that information.

The execution of threads using only the standard and the additional variable context information is shown in FIGS. 5A and 5B. User program 510 in FIG. 5B executes using "standard" class threads. Thread 500 executes a sequence of instructions. Instruction 502 causes the system to access kernel services by sending a message 504 and receiving the response 506 upon completion. Thread state 503 is maintained by thread 500 and saved on the context switch to kernel processing and restored upon return.

The user program in FIG. 5A requires the use of emulation support 520. User program thread 522 at instruction 524 makes a kernel system call by sending a message 526 to the kernel. The kernel recognizes operating that in cannot natively handle and passes these to emulation support 520 via message 528. The thread executing the emulation instructions is of an "emulation" class that requires additional thread state information. The thread_create call establishes the standard thread state area 530 and the additional emulation context area 532. A context switch out of the emulation thread would cause a context save of both the standard and emulation context areas.

An alternate embodiment of the present invention enables the thread class to define whether or not the variable context is to be saved on context switch. In many cases the variable context need not be saved through a context switch. The state maintained in the context may be pertinent only while the thread is executing and may be fully reestablished when thread execution resumes without saving and restoring the context. In these instances processor overhead is reduced by neither saving nor restoring the variable context data. Using the thread class a user is able to define what portions of the variable context are saved at a context switch.

Figure 1:
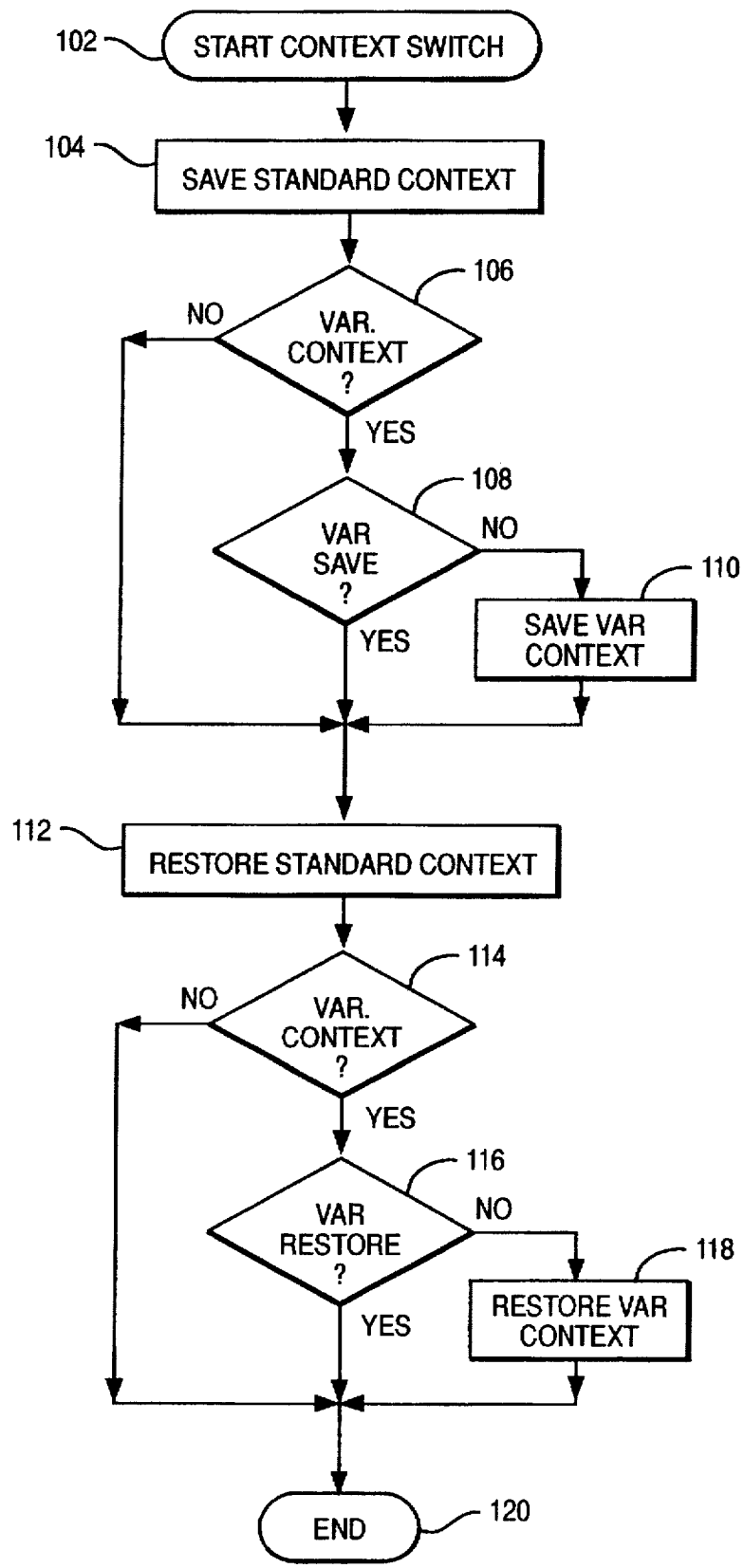
FIG. 1 is a flowchart depicting the process of one embodiment of the present invention.

A context switch according to this alternate embodiment follows the process depicted in FIG. 1. The context switch starts at 102. The standard context is saved in all cases 104. Next, the presence of a variable context is tested 106. If present, the flavor array is tested to determine whether the variable context is to be saved 108. If so, the variable context is saved 110. The standard context for the resuming thread is restored 112. The resuming thread is tested for variable context information 114 and whether it is to be restored 116. If required, the variable context is restored 118.

FIG. 1 illustrates the improvement in context switching performance obtainable by the present invention. The simple case requires only the saving and restoring of the standard thread state. The extended variable context is saved and restored only for those thread classes that have that state and even then only when saving and restoring is required through a context switch. The present invention thus provides a means for retaining a variable amount of thread state information without adding the overhead of saving and restoring the additional information even when a thread does not use it.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer implemented method for managing a thread in a multithreaded operating system, comprising the steps of:

creating a thread based on a thread class, the thread having a variable size memory area, including a standard thread state memory area, a variable thread state indicator memory area containing a value based on said thread class, and, if a variable state is indicated by said thread class, a variable thread state memory area;

detecting a thread context switch; and saving said current thread state memory area and, if indicated by said indicator, current variable thread state memory area, and restoring a new thread state memory area and, if indicated by a new indicator, a new variable thread state memory area based upon the thread class of the current thread.

2. A method as claimed in claim 1, wherein the thread state indicator indicates a normal thread state or an emulation thread state and wherein the variable thread state memory area contains emulator information and parameters.

3. The method of claim 2, wherein the emulation state is an X86 architecture emulation.

4. A computer implemented system for managing multiple threads of execution, said threads of execution executing in a computer system having a processor and memory means, said execution occurring in an execution context in said memory means, the system comprising:

first storage means for storing thread execution context information in a first format, wherein said first format includes a variable context pointer;

second storage means for storing a plurality of variable context storage formats, said second storage means addressed by said variable context pointer;

third storage means for optionally storing variable context information for a thread based upon the variable context storage format specified by said variable context pointer.

5. The system of claim 4, wherein said second storage means includes an X86 emulator format and said third storage means contains emulator values.

6. A computer program product having a computer readable medium having computer program logic recorded thereon for managing thread state information in a multi-threaded computer system, said computer program product comprising:

computer program product means having computer readable means for storing a first set of thread state information is a first storage means;

computer program product means having computer readable means for defining a thread class and storing a thread class indicator with said first set of thread state information;

computer program product means having computer readable means for storing a thread class flavor array for transforming a thread class pointer to a thread class variable context data structure;

computer program product means having computer readable means for optionally storing variable context thread state information in a second storage means according to the thread class variable context data structure indicated by said thread class indicator.

7. The computer program product of claim 6 wherein said thread class variable context data structure includes an indicator specifying whether said context data is saved on a context switch.

8. The computer program product of claim 7 wherein said thread class variable context data structure is an X86 architecture emulation and said indicator indicates that data is not saved on a context switch.

* * * * *